July 25, 1944.   L. RALKIN   2,354,613
INDICATING DEVICE FOR WELDING MACHINES
Filed Aug. 7, 1943
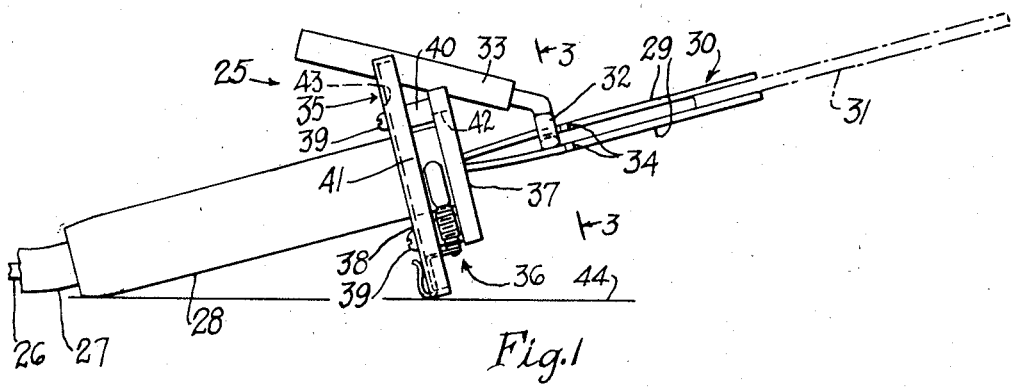
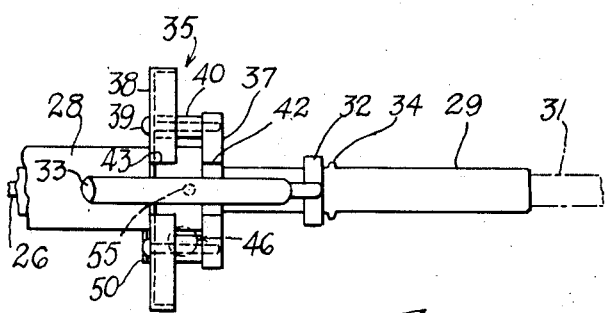
Fig. 2
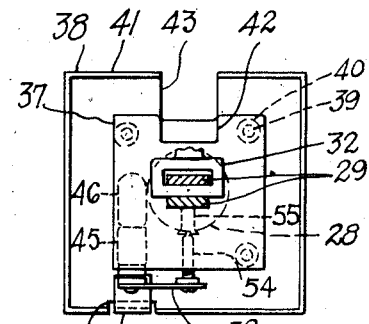
Fig. 3
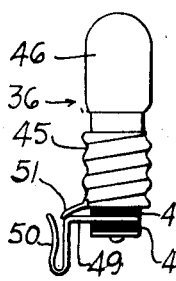
Fig. 4
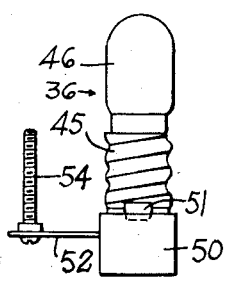
Fig. 5
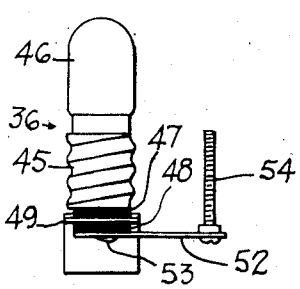
Fig. 6
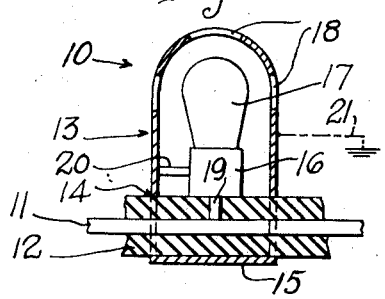
Fig. 7
INVENTOR.
Leo Ralkin
BY
Louis Schumacher, atty.

Patented July 25, 1944

2,354,613

UNITED STATES PATENT OFFICE 2,354,613

INDICATING DEVICE FOR WELDING MACHINES

Leo Ralkin, Jamaica, N. Y.

Application August 7, 1943, Serial No. 498,026

2 Claims. (Cl. 177—311)

This invention relates to indicating devices, and has particular reference to such devices for electrical welding machines.

One object of the invention is to provide a device of the character described having improve means whereby a circuit to an indicating device is completed with a minimum of wiring.

Another object of the invention is the provision of a device of the nature set forth having improved means such that a circuit for an indicating device is completed when the device is placed in any of various positions against a grounded floor, wall, or ceiling.

Certain structures, such as warships, consist in major part of metal. In fact, at one stage, practically everything consists of metal including walls, floors and ceilings, and in constructing or fabricating the same and related parts, large numbers of welding machines are used scattered throughout the ship. For efficient production it was found desirable to connect a plurality of electrode devices to each machine which may rectify or modify the voltage or currents, although each such machine can supply adequate current for welding to only one electrode unit. The reason is that considerable time is consumed in setting up the work, and in the performance of various related duties by the welder before he is ready to weld. Hence while one welder is welding, the other welder for the same machine is doing something else. Extremely long leads extend from the machine to the welding units for ample range. These leads are kept at a minimum and are reduced in size and weight by grounding the machine to the metal structure of the ship, the circuit being completed when an electrode or welding rod engaged therewith contacts that structure at any point however remote. Hence only a single lead or wire extends from the machine to each electrode unit. The welder, being at some distant point, perhaps obscured or hidden from the machine and from the other welder, cannot see whether that other welder is using current. If he tries to weld he may find that he obtains no current or insufficient current, without knowing whether the machine needs adjustment or repair or whether the other welder is using the current. Accordingly various indicating devices are provided to indicate to welders at points remote from the machine whether an electrode unit was in use. These devices aggravated an already serious condition in that they employed the regular two wire circuit from the machine, so that many more lines cluttered the floors and became entangled, creating a nuisance and causing considerable loss of time and labor.

It is therefore an element of the invention that I perceived the concept of a single wire or lead for an indicating device, such as the single wire or lead of the electrode unit, with a guard or cage protecting the indicating device, and being connected to a terminal of the indicating device to establish a ground and thus complete the circuit for the indicating device wherever the same might be placed or thrown. Hence the indicating device will show a welder whether current is available. If current is not available he knows that the other welding unit is in operation, and he goes on with various labors preliminary to welding. Thus considerable time is saved. The floors are not cluttered. The indicator may be quite close to the welder, however remote from the machine.

It is therefore an object of the invention to provide apparatus having improved means to avoid the difficulties and realize the advantages noted.

I have found that certain advantages are obtained in mounting the cage or guard directly on the handle of the electrode unit, so that it serves also as a shield for sparks that result from the welding. Further the guard may act as a support for the electrode unit to prevent accidental contact thereof with a plate or floor on which the unit may be rested. Also confusion between indicating devices or lamps that happen to lie close together is avoided. The indicator unit cannot be stolen. And by making the indicator device detachable and easily removable from the guard, the welder can place it safely among his personal belongings at the end of a day's work. Of course the circuit to the indicating device would be broken during actual welding, but then it is not needed, and the life of the device is conserved. But if light from the indicating device is desired, as for illumination or otherwise, during the welding operation, a piece of soft wire may be connected to any metal plate and to the guard to ground the same.

It is therefore another object of the invention to provide apparatus having improved means to accomplish the functions stated.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designed by the same reference characters throughout the several views.

In the drawing:

Figure 1 is a view in side elevation, with a welding rod in dot dash lines, showing a device embodying the invention, in a normal position of rest when not in use.

Fig. 2 is a top plan view thereof with a part removed.

Fig. 3 is a sectional view on line 3—3 of Fig. 1.

Figs. 4, 5 and 6 are views from different sides showing an indicator device in detached position, embodying the invention.

Fig. 7 is a schematic sectional view of a modification, illustrating a basic principle of the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the invention, a basic principle thereof is most clearly illustrated in Fig. 7 by a device 10 embodying the invention. Here an electrical conductor 11 is encased in insulation 12, on which is mounted a metallic guard or cage 13, as by openings at 14 between the bottom plate 15 of the cage and the upper portion of the same. Mounted in the cage or on the insulation 12 is a conventional screw socket 16 for a lamp 17, preferably of the neon type, the light of which is visible through openings 18 in the cage. The circuit is made by any contact 19 leading to the central terminal of the socket, the shell whereof is contacted at 20 with the cage. The circuit is completed by contact of the cage 13 at any point with a metal part of a wall, ceiling or floor of a ship, as schematically indicated at 21. In other words 21 is not intended to indicate a wire but rather to show that the cage 13 is a grounding element by contact at any point. The weight of the cage may help to assure a good contact, and of course the current required is very small. The indicator need not be a lamp 17 but may be illustrative of any device affording a visual or aural indication. It will be seen that the cage 13 constitutes an electrical part of the indicator.

Referring now to Fig. 1, there is shown an apparatus 25 embodying the principle of the device 10 in modified form. The single line conductor 26 insulated at 27 extends through a handle 28 of insulating material and is suitably connected to electrodes 29 which are angularly or hingedly movable relatively to each other to constitute a clamp 30, in any suitable manner (not shown). The electrodes desirably may be fixedly secured together to separate in a resilient manner for clamping on a welding rod 31. To cause such separation, a yokelike or slotted member 32 is engaged around one of the electrodes and is angularly moved by a handle 33. On pressing the handle 33 downward in Fig. 1, the electrodes are forcibly separated to release the rod 31. To prevent the yoke 32 from slipping off its electrode, the latter may have small lateral projections 34 thereon. As thus far described, the device 25 is conventional.

Mounted on the handle 28 adjacent to the electrodes is a guard or cage 35 for an indicating device 36. The guard may include a plate 37 of insulating material, and a plate 38 of metallic material. These plates are both secured to the handle and have central holes or recesses through or into which the handle is fitted. These plates are spaced from each other and are interconnected by screws 39, passing through insulator spacing sleeves 40. The plate 38 may be box-like or marginally flanged as at 41. Both plates 37 and 38 have respective cut outs 42, 43 to afford clearance for the handle 33. The plate 38 is substantially larger than the plate 37 so that when the device is rested on a surface 44, the plate 38 makes grounding contact therewith, with the electrodes raised upward to avoid accidental ground contact, which would cause current to flow through the electrodes. The device 25 may be similarly rested on a surface 44 on either side. Where a surface 44 is not available, the plate 38 may otherwise be contacted with ground.

The indicator unit 36 may include a conventional screw socket 45 for a lamp 46. At the base of the socket there are insulator plates 47, 48, between which is secured a plate 49 having a spring clamp 50, which is insulated from the socket, except that it is connected to the outside shell terminal as by a prong 51 struck therefrom or connected thereto. In insulated relation to the plate 49 is a plate 52 connected as by a pin 53 to the central terminal of the socket. This plate 52 is resilient and it may carry a contact or screw 54 adapted for contact with a screw 55 aligned therewith and which is threaded through the handle 28 into contact with the electrodes 29 and to thus secure the handle 28 on the electrodes. Formed in the plate 38 is a cut out 56 which removes part of the flange 41, whereby the clamp 50 can be clamped directly on the plate 38, moving up into the cut out 56 so that the bottom edge of the plate 38 is free of any obstruction. When thus secured, the prong 51 may directly contact the plate 38 and hence it need not be affixed to the plate 49 but may have wiping contact with both. In fact the prong 51 may be resilient and may frictionally grip the plate 38 to prevent accidental loosening of the clamp. In the mounted position, the plate 52 may resiliently strongly press the contact 54 against the screw 55.

With the unit 36 mounted as already described, the socket 45 and lamp 46 lie protectively housed between the plates 37, 38, and since the latter afford an open space, the light of the lamp is easily seen. When the light is greatly diminished or no light is present, the welder is warned that current is not available in sufficient quantity for his unit, and if he were to use it, the voltage in the line would drop. It is seen that the guard 35 actually forms a cage like that at 13 functioning in a like manner, and having various other advantages already described when associated with a welding unit as shown.

I claim:

1. A welding rod holding means, comprising an electrically conductive clamp portion and a handle portion at an end thereof, a shield on the handle adjacent to the clamp portion, comprising a pair of spaced plates, at least one of said plates being made of metal, a lamp socket located between the plates, a clamp for detachably mounting the socket on the metallic plate, associated means for engaging one terminal of the socket so as to be adapted to establish contact with the metallic plate, said metallic plate being electrically insulated from the said clamp portion, other means carried by the socket for establishing detachable electrical contact between the clamp portion and the other terminal of the socket, and a lamp engaged with the socket and lying between said plates, the latter being separated to permit emission of light from the lamp, whereby the lamp is protectively housed and is energized only when the metallic plate is contacted with ground to thus complete the circuit to the lamp to indicate the presence of current in the line feeding the said clamp portion.

2. A device for indicating the presence of electrical current in a line supplying the electrode clamp jaws of a welder's rod, including a handle for supporting at one end thereof the electrode clamp jaws and having a single electrical conductor extending therethrough to the jaws, a lamp socket for an indicator lamp, a guard mounted on the handle at said end thereof to protect the operator from welding sparks, said socket being mounted in the guard and the latter being adapted to receive the lamp and having openings for the emission of light from the lamp, one terminal of the socket being in electrically conductive relation to the electrodes and the other terminal being in electrically conductive relation to the guard, with the latter being adapted to serve as an electrical ground connection upon being contacted with a ground.

LEO RALKIN.